United States Patent
Leleu et al.

(10) Patent No.: US 11,753,611 B2
(45) Date of Patent: Sep. 12, 2023

(54) ALCOHOLIC BEVERAGE CONTAINING PARTICLES COMPRISING A CAVIAR-BASED FOOD

(71) Applicant: PERNOD RICARD, Paris (FR)

(72) Inventors: Martine Leleu, Longpont sur Orge (FR); Sébastien Bardon, Paris (FR); Julie Cani, Marseilles (FR); Thomas Delmas, Biot (FR)

(73) Assignee: PERNOD RICARD, Paris (FR)

( * ) Notice: Subject to any disclaimer, the term of this patent is extended or adjusted under 35 U.S.C. 154(b) by 177 days.

(21) Appl. No.: 17/190,114

(22) Filed: Mar. 2, 2021

(65) Prior Publication Data

US 2021/0179984 A1  Jun. 17, 2021

Related U.S. Application Data

(62) Division of application No. 15/560,797, filed as application No. PCT/FR2016/050639 on Mar. 23, 2016, now abandoned.

(30) Foreign Application Priority Data

Mar. 26, 2015 (FR) ..................... 15/52524

(51) Int. Cl.
| | | |
|---|---|---|
| *C12G 3/06* | (2006.01) | |
| *A23L 29/20* | (2016.01) | |
| *A23L 17/30* | (2016.01) | |
| *A23L 29/256* | (2016.01) | |
| *A23L 29/262* | (2016.01) | |

(52) U.S. Cl.
CPC ............... *C12G 3/06* (2013.01); *A23L 17/30* (2016.08); *A23L 29/20* (2016.08); *A23L 29/256* (2016.08); *A23L 29/262* (2016.08); *C12G 2200/21* (2013.01)

(58) Field of Classification Search
CPC ........ A23L 17/35; A23L 17/30; A23L 29/262; A23L 29/256; A23L 29/20; C12G 3/04; C12G 3/06; C12G 3/00

USPC ........................................................ 426/592
See application file for complete search history.

(56) References Cited

U.S. PATENT DOCUMENTS

| | | | |
|---|---|---|---|
| 2006/0280843 A1 | 12/2006 | Jager et al. | |
| 2012/0107468 A1* | 5/2012 | Doyle | ............... A23L 29/272 426/573 |

FOREIGN PATENT DOCUMENTS

| | | | |
|---|---|---|---|
| CA | 2 997 734 | A1 | 3/2015 |
| EP | 2305742 | A1 | 4/2011 |
| FR | 2947835 | A1 | 1/2011 |
| GB | 2471763 | A | 1/2011 |
| JP | S55-050868 | A | 4/1980 |
| JP | S58-205492 | A | 11/1983 |
| JP | H01-157344 | A | 6/1989 |
| JP | H04-320655 | A | 11/1992 |
| JP | 2006-174778 | A | 7/2006 |
| KR | 10-2011-0036522 | A | 4/2011 |
| RU | 2412602 | C2 | 2/2011 |
| WO | 2004/056211 | A1 | 7/2004 |
| WO | 2012/022375 | A1 | 2/2012 |

OTHER PUBLICATIONS

Jun. 15, 2016 International Search Report issued in International Patent Application No. PCT/FR2016/050639.

Dec. 3, 2019 Office Action issued in Japanese Patent Application No. 2017-549759.

* cited by examiner

*Primary Examiner* — Vera Stulii

(74) *Attorney, Agent, or Firm* — Oliff PLC

(57) ABSTRACT

The present invention relates to particles which include at least one gelled network of at least one gelling polysaccharide in which are embedded at least: one caviar-based food; one agent for reinforcing the gelled network of the gelling polysaccharide and which is resistant to alcohol; and water, preferably purified water. The present invention also relates to an alcoholic beverage (for example vodka) containing said particles, as well as a container filled with said alcoholic beverage.

18 Claims, 1 Drawing Sheet

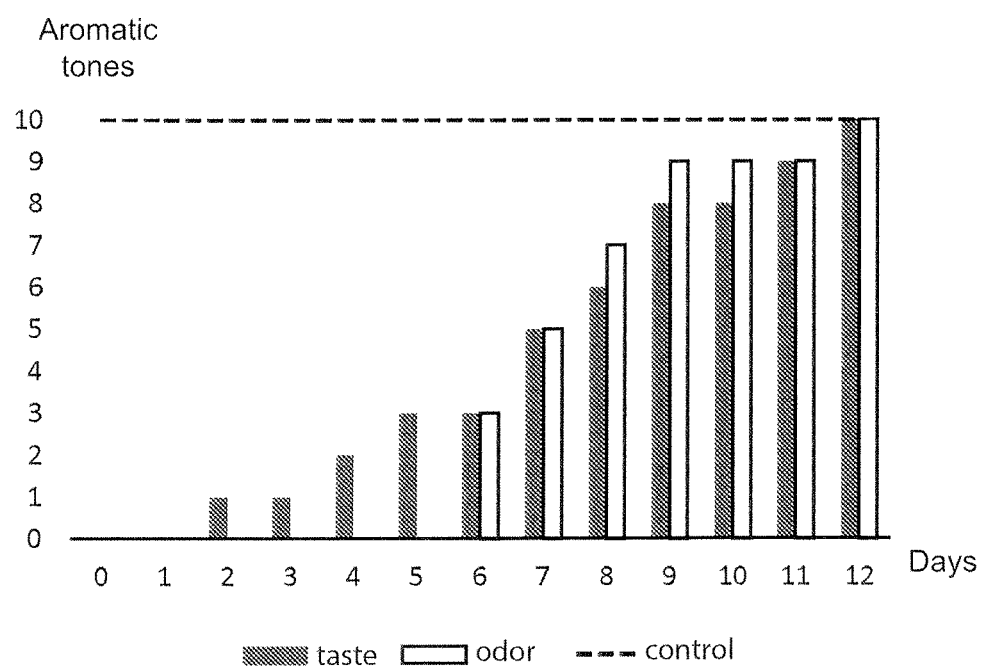

ALCOHOLIC BEVERAGE CONTAINING PARTICLES COMPRISING A CAVIAR-BASED FOOD

CROSS REFERENCE TO RELATED APPLICATIONS

This is a Division of application Ser. No. 15/560,797 filed Sep. 22, 2017, which in turn is a national stage of PCT/FR2016/050639 filed Mar. 23, 2016, which claims priority to FR 15/52524 filed Mar. 26, 2015. The disclosure of the prior applications is hereby incorporated by reference herein in its entirety.

BACKGROUND

The present invention concerns an alcoholic beverage in which particles containing a caviar-based food are immersed.

In the context of the present invention, it is meant by «alcoholic beverage», a beverage containing ethyl alcohol obtained by alcoholic fermentation of the sugars contained in fruits, vegetables, cereals, plants, grains, herbs or roots which produce this alcohol.

According to Regulation (EC) no. 110/2008 of the European Parliament and of the Council of Jan. 15, 2008 on the definition, designation, presentation, labeling and protection of spirituous beverages, the alcoholic strength by volume of an alcoholic beverage is defined by the ratio of the volume of pure alcohol present in the beverage at 20° C. to the total volume of said beverage at this same temperature. This ratio can be expressed in percentages.

In the context of the present invention, it is meant by «caviar-based food», any food comprising caviar. These may be wild, semi-wild or else farmed caviar. The term «caviar» is used in its broadest sense. It refers not only to eggs of fish in general (for example eggs of sturgeon, salmon, trout, lumpfish, herring, cod) but also eggs of snail (snail caviar) or even eggs of a batrachian. Preferably, it consists of the sturgeon caviar.

During the development of new beverages, we sought to incorporate caviar, a renowned luxurious food, into alcoholic beverages. However, this incorporation must be carried out in an appropriate manner so that the alcoholic beverages thus obtained preserve the known organoleptic properties of caviar, and even develop a fragrance and flavor pleasantly new and without unpleasant aftertaste or bad odor.

These requirements regarding the preservation of the organoleptic and visual properties of caviar in alcoholic beverages are at the origin of difficulties in the development of these beverages.

In addition, these difficulties are increased because of the complexity of the constitution of caviar-based foods.

The eggs of sturgeon, and in general, the eggs of fish or batrachian are complex elements containing among others water, proteins but also lipids, vitamins and minerals. These various constituents forming part of the composition of the eggs of fish or batrachian make these foods difficult to handle, and in particular when it is desired to add them in a beverage, particularly in an alcoholic beverage.

The direct suspension of caviar in an alcoholic beverage such as vodka results in rapid degradation of the structure of the caviar.

Some compounds of the caviar are very soluble in water, and therefore diffuse easily in an aqueous medium. The proteins of the caviar precipitate in alcohol. The lipids are partially soluble. These phenomena lead to the rapid visual degradation of the caviar in an alcoholic beverage. The eggs wilt, break and their contents diffuse into the alcoholic beverage which takes on a white-milky tone.

Moreover, the encapsulation of caviar in a membrane based on a gelling polymer such as an alginate membrane does not allow stopping the precipitation of its proteins and thus causes the hardening of the egg. Certainly, the alginate membrane partially allows preventing the leakage of the egg out of said membrane, but it does not ensure complete sealing. The egg hardens, its membrane becomes whitish and white filaments diffuse through the membrane into the alcoholic beverage. Thus, the encapsulation of caviar, for example with a membrane based on a gelling polymer, encounters difficulties and requires some optimization.

Furthermore, the addition in an alcoholic beverage of a caviar juice which comes from the rupture of the membrane of the eggs causes the precipitation of the proteins that it contains and which then form dense particles or clusters. The beverage takes on a white-milky tint and becomes turbid. Indeed, the caviar juice is sensitive to water and alcohol.

In addition, the encapsulation of caviar juice in a gelling membrane such as a simple alginate membrane does not allow keeping encapsulated the molecules of size less than 20 nm that the caviar juice contains. These too small molecules diffuse and create a disorder in the alcoholic beverage in which they have been immersed.

Thus, neither the caviar (in other words the eggs of a fish or a batrachian), nor the caviar juice coming from the rupture of the membrane of the eggs do prove to be exploitable constituents as such for their incorporation either directly or in an encapsulated form, for example with a membrane based on a gelling polymer, in alcoholic beverages. Indeed, their behavior with regards to the alcohol does not allow, either, their direct exploitation.

Moreover, there is known the patent application FR 2 947 835 A1, which describes a method for manufacturing an alcoholic beverage comprising the following steps:
- a maceration of an alcoholic solution with a caviar for a predetermined time period;
- a dilution of said alcoholic solution macerated by water;
- a distillation of said previously diluted macerated solution with water to obtain an alcoholic distillate comprising caviar essential oil.

This method described in the application FR 2 947 835 A1 allows extracting and concentrating the fragrances and the flavors of the caviar in alcoholic solutions without losing neither the volume percentage of alcohol nor the subtleties of the fragrance and the flavor of this food. The alcoholic beverage thus obtained by this method delivers to the nose a fragrance of the macerated caviar and to the palate a taste of this food as if it had just been eaten.

However, it should be noted that the method described in the application FR 2 947 835 A1 purifies a large portion of this raw material, that is caviar, to retain only the volatile aromatic molecules which are thus present in the alcoholic beverage. Thus, this method does not have to take account of the instability reactions of some of the non-volatile constituents of the caviar also known for their problems of ageing, oxidation and bad odor and which have been mentioned hereinabove, since it eliminates them. Indeed, the distillate obtained at the end of the method of the application FR 2 947 835 A1 does not contain these compounds of caviar which are problematic.

However, with the method described in the application FR 2 947 835 A1, the appearance and the texture of this luxury food, that is caviar, are in no way preserved. Thus, the alcoholic beverage obtained at the end of this method does not comprise caviar in suspension. This helps decreasing considerably the attraction for this alcoholic beverage flavored with caviar.

SUMMARY

The inventors of the present invention have sought to develop an alcoholic beverage containing a caviar-based food which differs from the alcoholic beverage obtained by the method described in the application FR 2 947 835 A1, because not only does this beverage preserve the gustatory properties of the caviar, but also and above all it maintains the visual properties (in other words the appearance) and texture of the caviar.

The inventors of the present invention have thus produced new particles containing a caviar-based food, as well as an alcoholic beverage which contains these particles.

The particles according to the invention perfectly mimic the texture, the taste and the appearance of the caviar. To this end, the inventors have overcome all the difficulties mentioned hereinabove inherent to the complex and varied constituents of caviar-based foods.

BRIEF DESCRIPTION OF THE DRAWING

FIG. 1 is a graph of the time of diffusion of caviar juice aromas in vodka at ambient temperature, the aromatic intensity in taste and odor as a function of the time of maceration of the particles in this vodka according to the invention.

DETAILED DESCRIPTION OF EMBODIMENTS

The first object of the present invention is a particle which is characterized in that it comprises at least one gelled network of at least one gelling polysaccharide in which are embedded at least:

a caviar-based food;
an agent for reinforcing the gelled network of the gelling polysaccharide and which is resistant to alcohol;
water, preferably purified water.

In other words, the particle according to the invention encapsulates a caviar-based food. More precisely, in the particle according to the invention, the caviar-based food is encapsulated in the gelled network of the gelling polysaccharide.

The gelled network of the gelling polysaccharide comprises a set of chains of macromolecules, said macromolecular chains are in the gelled state.

Preferably, the caviar-based food is a caviar juice.

In the context of the present invention, it is meant by «caviar juice» the juice which comes from the rupture of the membrane of the eggs of a fish, of snails or else a batrachian as detailed hereinabove. This rupture of the membrane of the eggs may result from the method of treatment and of cleaning of the caviar eggs or it may intervene voluntarily to obtain a caviar juice.

Advantageously, the caviar juice has been obtained from caviar whose viscosity is comprised between 500 and 5000 Cps, preferably between 1000 and 3000 Cps. In a very advantageous manner, the viscosity of the caviar is about 1500 Cps.

The caviar juice in the composition of the particles according to the invention has the advantage of preserving the visual and organoleptic qualities of the caviar while adapting, due to its liquid form, to the constraints of the manufacturing method of said particles which is described hereinafter and which is based on the milli-fluidic technique.

The inventors have thus exploited the known properties of formation of the network of macromolecular chains of a gelling polysaccharide to structure and contain caviar juice.

As explained hereinabove, the encapsulation of the caviar juice into particles of a gelling polymer certainly allows having particles having the appearance of caviar, but these particles are not stable when they are immersed in an alcoholic beverage.

Surprisingly, the inventors have discovered that the presence of an agent for reinforcing the gelled network of the gelling polysaccharide and which is further resistant to alcohol in the composition of particles encapsulating a caviar-based food allows maintaining the appearance of said particles when they are immersed in an alcoholic beverage, as well as the yield of formation of said particles, and this by decreasing the amount and the size of the satellite particles during the manufacture of said particles. In other words, the presence of this agent for reinforcing the gelled network and which is resistant to alcohol in the composition of the particles according to the invention allows better controlling their production.

In the composition of the particles according to the invention, the agent for reinforcing the gelled network of the gelling polysaccharide and which is resistant to alcohol has a thickening function and it thus helps ensure that said particles according to the invention do not retract when they are immersed in an alcoholic beverage.

Preferably, the gelling polysaccharide is chosen among the cation-reactive gelling polysaccharides.

In the context of the present invention, it is meant by "cation-reactive polysaccharide" a gelling polysaccharide capable of switching from a liquid state in an aqueous solution to a gelled state under the effect of contact with a solution containing ions of positive charge such as calcium, sodium and magnesium ions.

The gelling polysaccharide may be chosen among alginate salts such as sodium alginates or potassium alginates, gellans, carrageenans, pectins, gelatin and agar. It may be one of these compounds taken alone or in a mixture.

Preferably, the gelling polysaccharide is a sodium alginate. It is known that the structural properties of sodium alginate allow it to form a dense and resistant network.

The alginate essentially comprises two monomers which are alpha-L-guluronic acid and beta-D-mannuronic acid.

Preferably, the grade of sodium alginate is suitably chosen so that said alginate has a mass content of alpha-L-glucuronic acid which is greater than 50%, more preferably greater than 60% and even more preferably greater than 65%. Thus, preferably, the alginate of the composition of the particles according to the invention has a mass content of alpha-L-guluronic acid which is greater than that of beta-D-mannuronic acid. The gelled network of such an alginate has the advantage of being resistant; which also helps ensure that the particles according to the invention do not retract when they are immersed in an alcoholic beverage.

Advantageously, the sodium alginate has an average molar mass greater than 65 000. Such a sodium alginate has a resistant gelled network.

In an advantageous embodiment of the invention, the alginate has a mass content of alpha-L-guluronic acid greater than 50% and an average molar mass greater than 65 000.

The agent for reinforcing the gelled network of the gelling polysaccharide and which is resistant to alcohol may be chosen among hydroxypropylmethyl-cellulose (hereinafter abbreviated «HPMC»), carboxymethylcellulose, guar gum, xanthan or carob. It may be one of these compounds taken alone or in a mixture.

Preferably, the agent for reinforcing the gelling polysaccharide and which is resistant to alcohol is HPMC.

HPMC is a semi-synthetic polymer of the cellulose ether type. Its emulsifying, thickening and suspensive properties coupled to its inertia in ionic and hydroalcoholic solutions make this polymer particularly suitable for reinforcing the gelled network of the gelling polysaccharide in the particles according to the invention.

In addition, HPMC has the advantage of being very resistant to alcohol compared to the gelling polysaccharide which may be sodium alginate and whose gel is retracted if it is immersed in a hydro-alcoholic solution such as an alcoholic beverage.

In the particles according to the invention, the HPMC reinforces the gelled network of the macromolecular chains of the gelling polysaccharide so that when said particles are immersed in an alcoholic beverage, they preserve their sphericity and do not retract. In other words, the HPMC allows maintaining the cohesion of the constituents and the shape of the particles according to the invention, even when they are immersed in an alcoholic beverage.

In an embodiment of the invention, at least one food surfactant is further embedded in the gelled network of the gelling polysaccharide.

In the context of the present invention, it is meant by "food surfactant" a compound having surface-active properties, adapted to the preparation of food products.

In the composition of the particles according to the invention, the surfactant facilitates obtaining the spherical shape of said particles during their manufacture.

The food surfactant is advantageously chosen among molecules having surface-active properties and which are authorized in the food industry.

The European regulation concerning the food additives classified as emulsifiers is described in Directive 89/107/EEC of Dec. 21, 1988 and its subsequent modifications.

For example, the food surfactant may be chosen among lecithins, methylcelluloses, fatty acid salts based on calcium, magnesium, potassium, sodium, lactic esters of fatty acid mono- and diglycerides, citric esters of fatty acid mono- and diglycerides, tartaric esters of fatty acid mono- and diglycerides, glycerol esters of diacetyltartaric acid and fatty acids, mixed acetic and tartaric esters of fatty acid mono- and diglycerides, succinyl monoglycerides, glycerol and propylene glycol esters of lactyl fatty acids, stearyl citrate, cholic acid, soybean hemicellulose, polyoxyethylene stearate 40, poloxyethylene sorbitan monolaurate 20, polyoxyethylene sorbitan monooleate 80, polyoxyethylene sorbitan monopalmitate, polyoxyethylene sorbitan monostearate 20, polyoxyethylene sorbitan tristearate, phosphatidic acid ammonium salts, crosslinked cellulose gum, fatty acid sucroesters, sucrose oligoesters of the type I and type II, fatty acid polyglycerol esters, sodium stearoyl-2-lactylate, calcium stearoyl-2-lactylate, sorbitan monostearate, sorbitan monolaurate, sorbitan monooleate, sorbitan monopalmitate, polyoxyethylene stearate 8, sodium lauryl sulfate, cassia gum, peptones, sodium stearoyl fumarate, ethoxylated mono- and di-glycerides, coconut oil methylglycoside esters.

The surfactant may also be chosen among proteins coming, for example, from egg white, milk (whey, 3-lactoglobulin, casein), soybean, alfalfa leaf, fish as well as their derivatives and/or hydrolysates.

Preferably, the food surfactant is chosen among sodium stearoyl-2-lactylate, polysorbate 20 and polysorbate 80. Most preferably, it consists of polysorbate 20.

In an embodiment of the invention, in said gelled network is further embedded at least one compound chosen among food colorings and antioxidants.

For example, the food coloring may be chosen among curcumin, riboflavin, tartrazine, quinoline yellow, orange yellow S, cochineal, carminic acid, azorubine, amaranth, cochineal red A, erythrosine, allura red, patented blue, indigotine, indigo carmine, bright blue FCF, copper-chlorophyll complexes, chlorophyll copper complexes, chlorophyll, green S, caramel, sulfite caramel, ammonium caramel, brilliant black BN, black PN, squid ink, brown HT, annatto, bixin, norbixin, paprika extract, capsanthin, capsorubin, lycopene, β-apocarotenal-8', lutein, canthaxanthin, beet red, betanin, anthocyanins, titanium dioxide, iron oxide and hydroxide, aluminum, silver, gold, lithol rubin, aromatic plant extracts, fruit and vegetables juices with a coloring contribution.

Preferably, the coloring is carbon black or squid ink, taken alone or in a mixture.

The antioxidants are chosen among antioxidants authorized in the food industry. For example, the antioxidant may be chosen among ascorbic acid, sodium or calcium ascorbates, diacetyl 5-6-1-ascorbic acid, palmityl 6-1-ascorbic acid, butylhydroxyanisole, butylhydroxytoluol, octyl or dodecyl gallates, tocopherols, synthetic alpha-tocopherol, synthetic gamma-tocopherol or synthetic delta-tocopherol, all the tocopherols constituting the vitamin E, the extracts of lycopenes or beta-carotene, the plant extracts rich in polyphenols and/or flavonoids, tannins are extracted cocoa, coffee, tea, grapes, rosemary, anthocyanins and phenolic acids.

The particle may comprise, in mass percentages:
between 0.5% and 25%, preferably between 5% and 15%, of at least one caviar-based food;
between 0.5% and 3%, preferably between 1% and 2%, of at least one gelling polysaccharide;
between 0.015% and 1%, preferably between 0.05% and 0.3%, of at least one agent for reinforcing the gelled network of the gelling polysaccharide and which is resistant to alcohol;
between 70% and 98%, preferably between 80% and 95%, of water and more preferably of purified water;
optionally up to 3%, preferably between 0.00001% and 3%, more preferably between 0.1% and 2%, of at least one food surfactant;
optionally up to 1%, preferably up to 0.5%, more preferably between 0.05% and 0.1%, of at least one compound chosen among food colorings and antioxidants.

In a preferred embodiment of the invention, the particle comprises, in mass percentages:
12.5% of at least one caviar-based food;
1.2% of at least one gelling polysaccharide;
0.15% of at least one agent for reinforcing the gelled network of the gelling polysaccharide and which is resistant to alcohol;
0.2% of at least one food surfactant;
Qs 100% water, preferably purified water.

More preferably, the particle according to the invention comprises, in mass percentages:
12.5% of caviar juice;
1.2% of sodium alginate;
0.15% of HPMC;
0.2% of polysorbate 20;
Qs100% of purified water.

Advantageously, the diameter of the particles according to the invention is comprised between 1 mm and 10 mm, preferably between 1.5 mm and 5 mm, even more preferably about 2.5 mm.

The particles according to the invention have a monophasic structure with a core filled with caviar-based food, such as caviar juice.

The density of the particles according to the invention is advantageously greater than 1.

The particles according to the invention have a characteristic odor and taste of caviar. Their texture is firm but melting.

Another object of the present invention is an alcoholic beverage which comprises particles according to the invention.

Advantageously, the alcoholic strength by volume of the alcoholic beverage according to the invention expressed in percentages is advantageously at least 1.2%, preferably comprised between 15% and 96%, more preferably comprised between 15% and 70%.

The alcoholic beverage may be a beverage chosen among vodka, gin, tequila, mescal, grappa, rum, whiskey, calvados, sake, baijiu, wines, beverages comprising wine, beverages obtained from fermented constituents of vegetable origin, taken alone or in mixtures. Preferably, the alcoholic beverage is vodka.

Advantageously, the alcoholic beverage according to the invention comprises, in mass percentages, between 0.5% and 50%, preferably between 2% and 10%, of particles according to the invention.

The particles according to the invention encapsulating a caviar-based food facilitate the diffusion of the caviar aromas without the dispersion of the caviar-based food in the alcoholic beverage.

Indeed, when the particles according to the invention are immersed in an alcoholic beverage, only the caviar aromas escape from the particles and diffuse into the entire alcoholic beverage.

This confers to the alcoholic beverage the odor and taste of the caviar and the caviar-based food remains embedded in the macromolecular chains of the gelled network of the gelling polysaccharide. The network of macromolecular chains of the gelling polysaccharide prevents the diffusion of the solid particles of the caviar-based food out of the particle according to the invention.

In addition, as explained hereinabove, thanks to the gelled network of the gelling polysaccharide whose resistance is reinforced thanks to the reinforcing agent that the particles according to the invention comprise, said particles immersed in an alcoholic beverage do not deform, preserve their sphericity and their contents do not leak through said particles.

The particles according to the invention which are therefore filled with a caviar-based food (or in other words which encapsulate a caviar-based food) have a visual appearance very similar to that of caviar.

Thus, the particles immersed in the alcoholic beverage according to the invention perfectly imitate the caviar both by their appearance and taste.

The alcoholic beverage containing the particles containing a caviar-based food according to the invention further has the advantage of having a transparency visually identical to the alcoholic beverage devoid of these particles.

Another object of the present invention is a recipient filled with an alcoholic beverage according to the invention as described hereinabove (namely an alcoholic beverage which contains particles according to the invention). For example, the recipient may have the shape of a bottle or a carafe. The recipient is characterized in that it further comprises a container configured to hold the particles according to the invention in suspension in said recipient (or, in other words, at a determined height in said recipient).

The particles according to the invention are disposed in said container and a recipient filled with an alcoholic beverage is thus obtained and in which the particles are held in suspension thanks to said container. The container may include fastening means which are configured to hold the container at a determined height in the recipient.

The container may have very varied geometric shapes, for example a generally spherical, parallelepiped or ovoid shape. The container can thus be a cage, a basket or still a rack, which is configured to receive the particles according to the invention and hold them in suspension in the recipient filled with an alcoholic beverage.

Another object of the present invention is a particle encapsulating at least one caviar-based food which is likely to be obtained by a manufacturing method which comprises at least the following steps:

a) dissolving and hydrating at least one gelling polysaccharide in water, preferably purified water, so as to obtain a solution;

b) adding, with stirring, in this solution, at least one agent for reinforcing the gelled network of the gelling polysaccharide and which is resistant to alcohol, optionally at least one compound chosen among food surfactants, food colorings and antioxidants, and at least one caviar-based food so as to obtain a viscous paste;

c) forming drops by passing the viscous paste obtained at step b) into a device configured for the formation of drops from said viscous paste;

d) immersing the drops obtained at step c) in a gelling solution so as to form particles;

e) recovering the particles thus formed.

Optionally, before recovering the particles, they are rinsed and drained.

The caviar-based food, the gelling polysaccharide and the agent for reinforcing the gelled network of the polysaccharide and which is resistant to alcohol may be chosen among those described hereinabove.

Preferably, the caviar-based food is a caviar juice.

At step b), the caviar-based food is advantageously added last to the solution.

Optionally, at step b), compounds chosen among the food surfactants, food colorings and antioxidants which have been described hereinabove can be added to the solution.

Advantageously, the constituents and their respective amounts are chosen in a determined manner so that the viscous paste obtained at the end of step b) has a viscosity comprised between 1000 and 7000 Cps, preferably between 1500 and 5000 Cps, and even more preferably from about 1700 Cps. Such viscosity of the viscous paste is particularly suitable for the formation during step d) of particles according to the invention having a shape and a size very similar to those of caviar.

The mass percentage of the gelling polysaccharide which has been dissolved in water at step a) is chosen in a determined manner to control the viscosity of the viscous paste obtained at step b) and thus to form during step d) particles having a quasi-spherical shape rather than particles in the form of drops which would therefore not have the visual appearance of the caviar.

Step b) is advantageously carried out under mechanical stirring.

During step b), the network of macromolecular chains of the gelling polysaccharide directly integrates the caviar-based food, and thus before the gelation of the gelling polysaccharide by the gelling solution of step d).

At the end of step b), it is obtained a viscous paste which may comprise, in mass percentages:
- between 0.5% and 25%, preferably between 5% and 15%, of the caviar-based food;
- between 0.5% and 3%, preferably between 1% and 2%, of at least one gelling polysaccharide;
- between 0.015% and 1%, preferably between 0.05% and 0.3%, of at least one agent for reinforcing the gelled network of the gelling polysaccharide and resistant to alcohol;
- between 70% and 98%, preferably between 80% and 95%, of water and more preferably of purified water;
- optionally up to 3%, preferably between 0.00001% and 3%, more preferably between 0.1% and 2%, of at least one food surfactant;
- optionally up to 0.5%, preferably between 0.05% and 0.1%, of at least one compound chosen among food colorings and antioxidants.

Step c) of forming drops from the viscous paste is carried out in a device for forming drops perfectly within the reach of those skilled in the art.

Advantageously, the device is configured to form drops having a size comprised between 1 mm and 10 mm, preferably between 1.5 mm and 5 mm.

The device for forming drops is in the milli-fluidic technical field.

For example, the device for forming drops is equipped with a nozzle through which the viscous paste passes in such a way that at the end of said nozzle, drops as detailed above, are expelled.

During step c) of forming drops, the drop height of the drops (namely, the vertical height separating the end of the device for forming drops from which the drop of the surface of the gelling solution is expelled) is appropriately chosen to form drops of spherical shape. Thus, if the drop height is too low, drops of elongated shape can be formed and, on the contrary, if the drop height is too great, drops of flattened shape can be formed. The determination of the drop height of the drops is perfectly within the reach of those skilled in the art.

The gelling solution of step d) of the manufacturing method is, for example, an aqueous solution of a salt of the XnMm type, where X may be a halide ion such as a chloride ion, a tartrate ion or still a lactate ion, or else a gluconate ion and M is advantageously a cation of an alkaline earth metal such as calcium, magnesium or sodium, and n and m are greater than or equal to 1.

The mass percentage of salt of XnMm type in the gelling solution is advantageously comprised between 5% and 20%.

In an embodiment of the invention, the gelling solution is an aqueous solution of calcium lactate. Preferably, the water contained in said gelling solution is purified water.

In an advantageous embodiment of the invention, the gelling solution is a solution comprising purified water, calcium lactate or calcium chloride. Preferably, the gelling solution comprises purified water and calcium lactate, the mass content of calcium lactate in this solution being advantageously 6%.

During step d), as soon as the drops fall into the gelling solution, they solidify immediately, since the network of the gelling polysaccharide is formed in contact with the ions which comprise the gelling solution.

In other words, as soon as they are brought into contact with the gelling solution, the molecules of the gelling polysaccharide pass from a state in which they are free and disordered to a state in which they are more or less rigid. There is therefore a transition in the ordering of these molecules.

In the gelled state, the individual macromolecular chains of the gelling polysaccharide form, with the cations of the gelling solution, a coherent three-dimensional network which retains the caviar-based food and prevents its flow out of the particle.

In a preferred embodiment of the method, the gelling polysaccharide is a sodium alginate and the gelling solution is an aqueous solution of calcium lactate.

The alginate is a polymer of brown algae (*Laminaria macrocystis*) constituted by the repetition of monomers of D-mannuronic acid (block M) and alpha L-guluronic acid (block G). This polymer is a long chain molecule negatively charged by the presence of the carboxyl groups ($CO_2^-$). During the gelation of this polymer, its negative charges are compensated by the calcium ions of the gelling solution. The divalent character of the calcium ions allows forming a network by linking two chains of alginate. The blocks G retain the calcium ions by coordination. The aggregation of the parallel chains leads to a regular three-dimensional geometric assembly called an ionoreversible and non thermoreversible "egg box". The blocks G increase the plasticity of the gel as well as the size of the pores. The blocks M make the gel more elastic and reduce the size of the pores.

The particles remain immersed in the gelling solution during a determined duration in such a way that the ions contained in the gelling solution have the time to diffuse to the core of the particle. A too short immersion time in the gelling solution could make the particles fragile and misshapen. The choice of the duration of immersion of the particles in the gelling solution is within the reach of those skilled in the art.

Furthermore, the gelation duration has an effect on the elasticity level of the particle according to the invention.

Once the particles are obtained by the method as described hereinabove, they can be incorporated into an alcoholic beverage.

Another object of the present invention is an alcoholic beverage which contains these particles likely to be obtained by the manufacturing method as described hereinabove.

The alcoholic beverage may be a beverage as described hereinabove.

Advantageously, the alcoholic beverage comprises, in mass percentages, between 0.5% and 50%, preferably between 2% and 10%, of said particles likely to be obtained by the manufacturing method as described hereinabove.

The alcoholic strength by volume of the alcoholic beverage is advantageously at least 1.2%, preferably comprised between 15% and 96%, more preferably comprised between 15% and 70%.

EXPERIMENTAL PART

I—Study of the Viscosity of Viscous Pastes Obtained by Varying the Alginate and HPMC Mass Contents First, different viscous pastes (tests 1 to 6) were prepared by varying the mass contents of HPMC and sodium alginate and the viscosity of the viscous pastes thus obtained, was measured.

The viscous pastes were prepared by performing steps a) to b) of the particle manufacturing method which has been described hereinabove, namely:
   a) preparing a solution by dissolving sodium alginate in purified water.
   b) adding to this solution, with mechanical stirring, HPMC, polysorbate 20, vegetable carbon and finally caviar juice so as to obtain a viscous paste.

Table 1 below details for the viscous pastes thus obtained of tests 1 to 6, the mass contents of their different constituents, namely:
   sodium alginate;
   HPMC;
   polysorbate 20;
   caviar juice;
   vegetable carbon;
   purified water.

In the viscous pastes of these tests 1 to 6, polysorbate 20 is a food surfactant. Vegetable carbon is a coloring used to color the viscous paste.

The caviar juice was an emulsion coming from the rupture of the sturgeon egg membrane.

This emulsion is more viscous than water. It has a density of 1.09 and contains heterogeneous particle size.

It should be noted that among these 6 tests, only test no. 5 was a test which resulted in obtaining a viscous paste such as obtained at the end of step b) of the method for manufacturing particles according to the invention.

The other tests are comparative tests, since they are devoid of caviar juice, HPMC or sodium alginate, depending on the case.

paste of test no. 5 is almost double that of the viscous paste of test no. 6 (viscous paste devoid of HPMC).

The comparison of the viscosity of the viscous pastes of tests no. 5 and 6 demonstrates the importance of HPMC in the physical properties of the obtained viscous paste and which is intended to be gelled in a gelling solution for obtaining spherical particles according to the invention.

II—Study of the Variation in the Mass Content of Sodium Alginate in Caviar Juice Particles Particles were prepared according to the method for manufacturing particles according to the invention which has been described hereinabove, namely:
   a) preparing a solution by dissolving sodium alginate in purified water.
   b) adding to this solution, with mechanical stirring, HPMC, polysorbate 20 and caviar juice so as to obtain a viscous paste.
   c) forming drops by passing the viscous paste into a nozzle whose diameter at the drop outlet is suitably chosen for the desired particle diameter.
   d) immersing the drops obtained at step d) in a gelling solution containing calcium lactate and purified water, the mass content of calcium lactate in said solution was 6%.
   e) recovering the particles thus formed.

Table 2 below details for the viscous pastes of tests 7 to 10, the mass contents of their different constituents, namely:
   sodium alginate;
   HPMC;
   polysorbate 20;
   caviar juice;
   purified water.

TABLE 1

Mass contents of the constituents of the viscous pastes of tests 1 to 6 and measurement of the viscosity of these viscous pastes

|  | Test 1 | Test 2 | Test 3 | Test 4 | Test 5 | Test 6 |
| --- | --- | --- | --- | --- | --- | --- |
| sodium alginate | 1.50% | 1.30% | 0.30% | 0.00% | 1.20% | 1.20% |
| HPMC | 0.00% | 0.20% | 1.20% | 1.50% | 1.50% | 0.00% |
| polysorbate 20 | 0.00% | 0.00% | 0.00% | 0.00% | 0.20% | 0.20% |
| caviar juice | 0.00% | 0.00% | 0.00% | 0.00% | 12.50% | 12.50% |
| vegetable carbon | 0.00% | 0.00% | 0.00% | 0.00% | 0.70% | 0.70% |
| water | 98.50% | 98.50% | 98.50% | 98.50% | 98.65% | 98.80% |
| viscosity (Cps) | 1740 | 3220 | 19700 | 21700 | 2860 | 1520 |

The results detailed in Table 1 demonstrate that HPMC has a texturizing effect on the viscous paste much more important than that of sodium alginate, because at equivalent mass content (for example 1.5%), the viscosity of the viscous paste containing only HPMC (namely, test no. 4) is 12.5 times higher than that of the viscous paste containing only sodium alginate (namely test no. 1). In other words, the HPMC enhances the texture (or, in other words, has a thickening effect) of the viscous paste.

However, the viscous paste containing only HPMC (namely, test no. 4) is much more elastic and shiny than the viscous paste containing only sodium alginate (namely, test no. 1). That is why, a viscous paste containing only HPMC would not be suitable for the formation of particles according to the invention.

By comparing the viscosities of the viscous pastes of the tests 5 and 6 which further contained, with regards to tests 1 to 4, polysorbate 20, caviar juice and vegetable carbon, it is observed that the presence of 0.15% HPMC in the composition of the viscous paste has the effect of almost doubling its viscosity. Indeed, the viscosity of the viscous In the viscous pastes of these tests 7 to 10, the polysorbate 20 is a food surfactant.

The caviar juice was an emulsion coming from the rupture of the sturgeon egg membrane. This emulsion is more viscous than water. It has a density of 1.09 and contains heterogeneous particle size.

TABLE 2

Mass contents of the constituents of the viscous pastes of tests 7 to 10, drop height of the drops and indication of the sphericity of the particles and the presence or absence of satellite particles

|  | Test 7 | Test 8 | Test 9 | Test 10 |
| --- | --- | --- | --- | --- |
| sodium alginate | 1.00% | 1.20% | 1.30% | 1.50% |
| polysorbate 20 | 2% | 2% | 2% | 2% |
| HPMC | 0.15% | 0.15% | 0.15% | 0.15% |
| Caviar | 12.50% | 12.50% | 12.50% | 12.50% |

TABLE 2-continued

Mass contents of the constituents of the viscous pastes of tests 7 to 10, drop height of the drops and indication of the sphericity of the particles and the presence or absence of satellite particles

|  | Test 7 | Test 8 | Test 9 | Test 10 |
|---|---|---|---|---|
| water | 84.35% | 84.15% | 84.05% | 83.85% |
| drop height (cm) | 5 | 9 | 12 | 12 |
| sphericity of particles | yes | yes | yes | tail |
| satellite particles | little | Very little and tiny | small | very little |

In Table 2 hereinabove, the following elements are also detailed for tests 7 to 10:
the drop height of the drops during the step of forming said drops (namely step d) hereinabove);
the sphericity of the recovered particles;
the presence or absence of satellite particles among the recovered particles.

Based on the results of Table 2, it is observed that the particles have an acceptable sphericity as from a mass content of 1.2% sodium alginate.

In addition, it is noted that the amount and size of the satellite particles increase when the percentage of sodium alginate decreases.

In order to determine whether this increase in the amount and size of the satellite particles was due to sodium alginate or only to the viscosity of the viscous paste, two other tests (tests no. 11 and 12) are performed in which the mass content of HPMC in the viscous paste was no longer 0.15% but 0.3%.

Table 3 below details for the viscous pastes of tests 11 and 12, the mass contents of their different constituents, namely:
sodium alginate;
HPMC;
polysorbate 20;
caviar juice;
purified water.

In Table 3 hereinabove, the following elements are also detailed for the tests no. 11 and 12:
the drop height of the drops during the step of forming said drops (namely step d) hereinabove);
the sphericity of the recovered particles;
the presence or absence of satellite particles among the recovered particles.

TABLE 3

Mass contents of the constituents of the viscous pastes of tests 11 and 12, drop height of the drops, indication of the sphericity of the particles and the presence or absence of satellite particles

|  | Test 11 | Test 12 |
|---|---|---|
| sodium alginate | 1.00% | 1.10% |
| polysorbate 20 | 2% | 2% |
| HPMC | 0.30% | 0.30% |
| caviar | 12.50% | 12.50% |
| water | 84.20% | 84.10% |
| drop height (cm) | 9 | 15 |
| sphericity | yes | tails |
| satellite particles | small | very little and tiny |

The test no. 11 shows as many satellite particles as test no. 7, but these satellite particles are smaller. However, these satellite particles are larger and more numerous than those of the particles of test no. 12.

Furthermore, the presence of 0.1% more sodium alginate in the viscous paste of test no. 12 than in the viscous paste of test no. 11 has the effect of increasing the viscosity of the viscous paste and decreasing the size and amount of the satellite particles. However, the particles have lost their sphericity. Indeed, the particles of test no. 12 are no longer spherical.

These tests demonstrate that there is therefore a balance between the amount of sodium alginate and HPMC in the composition of the particles which allows forming solid particles containing caviar juice while preserving good sphericity and minimizing the size and amount of the satellite particles.

III—Study of the Variation of the Mass Content of HPMC in Caviar Juice Particles Other caviar juice particles were prepared in the same manner as for tests no. 7 to 12, by fixing the mass percentage of sodium alginate in the viscous paste at 1.2% and by varying the mass content of HPMC, so as to determine the optimum mass contents of HPMC of caviar juice particles.

Table 4 below details for the viscous pastes of tests 13 to 15 the mass contents of their various constituents, namely:
sodium alginate;
HPMC;
polysorbate 20;
caviar juice;
purified water.

In Table 4 hereinabove, the following elements are also detailed for tests no. 13 to 15:
the drop height of the drops during the step of forming said drops (namely step d) hereinabove);
the sphericity of the recovered particles;
the presence or the absence of satellite particles among the recovered particles.

TABLE 4

Mass contents of the constituents of the viscous pastes of tests 13 to 15, drop height of the drops, indication of the sphericity of the particles and the presence or absence of satellite particles

|  | Test 13 | Test 14 | Test 15 |
|---|---|---|---|
| alginate | 1.20% | 1.20% | 1.20% |
| polysorbate 20 | 2% | 2% | 2% |
| HPMC | 0.00% | 0.15% | 0.20% |
| caviar | 12.50% | 12.50% | 12.50% |
| water | 84.30% | 84.15% | 84.10% |
| drop height (cm) | 5.5 | 9 | 13 |
| sphericity | yes | yes | yes |
| Satellite particles | a lot | Very little and tiny | small |

Based on the results of Table 4, the test no. 13 shows that HPMC allows reducing the size and the amount of the satellite particles. The drop height, directly correlated with the viscosity, indicates that the HPMC plays an important role in the viscosity of the viscous paste.

IV—Study of the Variation in the Mass Content of Polysorbate 20 in Caviar Juice Particles Finally, tests were performed by producing caviar juice particles for which the mass content of polysorbate 20 in the viscous paste has been varied from 2 to 0.2%.

It has been found that by decreasing the mass content of the polysorbate 20 from 2 to 0.2% in the viscous paste, this allows decreasing the drop height of the drops during the step of forming said drops (namely step d) hereinabove. For reasons of optimizing the use of the device for forming drops, the smallest drop height of drops sufficient to allow forming spherical drops is sought.

In addition, the decrease in the mass content of the polysorbate 20 has no influence on the viscosity of the viscous paste, because the number and the amount and the quality of the particles remained globally identical during these additional tests.

V—Experiments with Particles According to the Invention Dissolved in an Alcoholic Beverage (Vodka)

In the context of these experiments, particles according to the invention having the following composition in mass percentages were used:
 85.25% purified water;
 12.5% caviar juice;
 1.5% sodium alginate;
 2% polysorbate 20;
 0.15% HPMC.

The particles according to the invention have been formed from a gelling solution containing in mass percentages: 6% calcium lactate and 94% purified water.

13.8 g of these particles were added to a bottle containing 345 mL of vodka so as to obtain an alcoholic beverage according to the invention. This was equivalent to 20 g of particles containing 2.5 g of caviar juice in 500 mL of vodka.

The kinetics of infusion of caviar juice aromas in this vodka was estimated on a daily basis by sensory analysis during 12 days.

The aspect, odor and taste were evaluated on samples placed at ambient temperature, 4° C. and 30° C.

The graph of FIG. 1 indicates the time of diffusion of the caviar juice aromas in the vodka at ambient temperature, the aromatic intensity in taste and odor as a function of the time of maceration of the particles in this vodka according to the invention.

The results in FIG. 1 indicate a gradual infusion over the 12 days. The odor of caviar appears on the $6^{th}$ day. It becomes stronger the following days. The taste appears on the $2^{nd}$ day and becomes more intense day by day. After 12 days, the samples have the odor and taste of the control sample at 5 g/L of caviar juice in vodka.

The aspect of the particles remained the same over time at all tested temperatures.

It is interesting to note that temperature has an influence on the perception and infusion of the caviar. Indeed, the sample kept at 4° C. has a slow infusion which results in caviar odor and taste less pronounced than the same sample kept at ambient temperature for an equivalent duration. Conversely, the sample kept at 30° C. infuses more quickly than at ambient temperature.

These results show that an alcoholic beverage according to the invention such as vodka remains stable over time and allows the diffusion of caviar aromas in said beverage without changing the appearance of the particles and without changing the visual appearance of the limpidity of the beverage.

Furthermore, it is noted that the infusion kinetics, at moderate temperature (namely between about 20 and 25° C.) is slow (about 12 days).

The invention claimed is:

1. An alcoholic beverage comprising, in mass percentage, between 0.5% and 50% of particles, wherein the particles comprise a gelled network of at least one gelling polysaccharide in which are embedded:
 caviar juice;
 hydroxypropylmethyl-cellulose (HPMC); and
 water,
 wherein:
  the particles comprise, in mass percentages:
   between 0.5% and 25% of the caviar juice;
   between 0.5% and 3% of the gelling polysaccharide;
   between 0.015% and 1% of the HPMC; and
   between 70% and 98% of the water, and
  the gelling polysaccharide is selected from the group consisting of sodium or potassium alginates, gellans, carrageenans, pectins, gelatin, and agar.

2. The alcoholic beverage according to claim 1, wherein the water is purified water.

3. The alcoholic beverage according to claim 1, wherein the gelling polysaccharide is a sodium alginate.

4. The alcoholic beverage according to claim 1, further comprising a food surfactant embedded in the gelled network.

5. The alcoholic beverage according to claim 4, wherein the food surfactant is selected from the group consisting of sodium stearoyl-2-lactylate, polysorbate 20, and polysorbate 80.

6. The alcoholic beverage according to claim 4, wherein the particles comprise, in mass percentages:
 percentage, between 0.00001% and 3% of the food surfactant.

7. The alcoholic beverage according to claim 1, wherein the particles comprise, in mass percentages:
 between 5 and 15% of the caviar juice;
 between 1% and 2% of the gelling polysaccharide;
 between 0.05% and 0.3% of the HPMC; and
 between 80% and 95% of the water.

8. The alcoholic beverage according to claim 1, comprising, in mass percentage, between 2% and 10% of the particles.

9. The alcoholic beverage according to claim 1, wherein the alcoholic beverage is selected from the group consisting of vodka, gin, tequila, mescal, grappa, rum, whiskey, calvados, sake, baijiu, wines, beverages comprising wine, beverages obtained from fermented constituents of vegetable origin, and combinations thereof.

10. The alcoholic beverage according to claim 1, wherein the particles are obtained by a manufacturing method comprising:
 a) dissolving and hydrating the gelling polysaccharide in water so as to obtain a solution;
 b) adding into the solution, with stirring:
  the caviar juice,
  the HPMC, and
  optionally a compound selected from the group consisting of food surfactants, food colorings and antioxidants so as to obtain a viscous paste;
 c) forming drops by passing the viscous paste into a device configured for the formation of drops from said viscous paste;
 d) immersing the drops in a gelling solution so as to form particles; and
 e) recovering the particles thus formed.

11. A recipient filled with the alcoholic beverage according to claim 1, wherein the recipient further comprises a container configured to hold the particles to a determined height in said recipient.

12. The alcoholic beverage according to claim 4, wherein the particles comprise, in mass percentage, between 0.1% and 2% of the food surfactant.

13. The alcoholic beverage according to claim 1, wherein the particles comprise, in mass percentage, up to 1% of at least one compound selected from the group consisting of food colorings and antioxidants.

14. The alcoholic beverage according to claim 13, wherein the particles comprise, in mass percentage, between 0.05% and 0.1% of the at least one compound selected from the group consisting of food colorings and antioxidants.

15. An alcoholic beverage comprising, in mass percentage, between 2% and 10% of particles, wherein the particles comprise a gelled network of a sodium alginate in which are embedded, in mass percentages:
    caviar juice;
    hydroxypropylmethyl-cellulose (HPMC);
    purified water;
    a food surfactant; and
    at least one compound selected from the group consisting of food colorings and antioxidants,
    wherein the particles comprise, in mass percentages:
        between 5 and 12.50% of the caviar juice;
        between 1.20% and 1.50% of the sodium alginate;
        between 0.15% and 1.50% of the HPMC; and
        between 83.85% and 98.65% of the purified water; and
        between 0.1% and 2% of the food surfactant.

16. The alcoholic beverage according to claim 15, wherein the particles comprise, in mass percentage, between 0.15% and 0.3% of the HPMC.

17. The alcoholic beverage according to claim 15, wherein the particles have a diameter between 1 mm and 10 mm.

18. The alcoholic beverage according to claim 17, wherein the particles have a diameter between 1.5 mm and 5 mm.

* * * * *